US010489309B2

(12) United States Patent
Koufaty et al.

(10) Patent No.: US 10,489,309 B2
(45) Date of Patent: Nov. 26, 2019

(54) MEMORY PROTECTION KEY ARCHITECTURE WITH INDEPENDENT USER AND SUPERVISOR DOMAINS

(71) Applicant: Intel Corporation, Santa Clara, CA (US)

(72) Inventors: David A. Koufaty, Portland, OR (US); Gilbert Neiger, Hillsboro, OR (US); Rajesh M. Sankaran, Portland, OR (US); Andrew V. Anderson, Forest Grove, OR (US); Subramanya R. Dulloor, Hillsboro, OR (US); Werner Haas, Braunschweig (DE); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 14/519,648

(22) Filed: Oct. 21, 2014

(65) Prior Publication Data
US 2016/0110298 A1   Apr. 21, 2016

(51) Int. Cl.
*G06F 12/08* (2016.01)
*G06F 12/14* (2006.01)
*G06F 21/52* (2013.01)

(52) U.S. Cl.
CPC .......... *G06F 12/1466* (2013.01); *G06F 21/52* (2013.01); *G06F 2212/1052* (2013.01)

(58) Field of Classification Search
CPC .................................................. G06F 12/0882
See application file for complete search history.

(56) References Cited

U.S. PATENT DOCUMENTS

| 2002/0046305 A1 | 4/2002 | Babaian et al. |
| 2003/0014667 A1 | 1/2003 | Kolichtchak |
| 2004/0105298 A1* | 6/2004 | Symes .................. G06F 9/4812 365/149 |

(Continued)

FOREIGN PATENT DOCUMENTS

| CN | 1723448 A | 1/2006 |
| EP | 2709018 A1 | 3/2014 |

(Continued)

OTHER PUBLICATIONS

TIPO, search report for Taiwan Patent Application No. 104130291, dated Jul. 19, 2016, 1 page.

(Continued)

*Primary Examiner* — Josnel Jeudy
(74) *Attorney, Agent, or Firm* — Lowenstein Sandler LLP

(57) ABSTRACT

A processing system includes a processing core to execute a task and a memory management unit, coupled to the core. The memory management unit includes a storage unit to store a page table entry including one or more identifiers of memory frames, a protection key, and an access mode bit indicating whether the one or more memory frames are accessible according to a user mode or according to a supervisor mode, a first permission register including a plurality of fields, each field comprising a set of bits reflecting a set of memory access permissions under the user mode, and a second permission register storing a plurality of fields, each field comprising a set of bits reflecting a set of memory access permissions under the supervisor mode.

22 Claims, 12 Drawing Sheets

(56) References Cited

U.S. PATENT DOCUMENTS

| | | | |
|---|---|---|---|
| 2004/0148480 A1 | 7/2004 | Watt et al. | |
| 2006/0036830 A1* | 2/2006 | Dinechin | G06F 21/79 |
| | | | 711/200 |
| 2008/0016297 A1 | 1/2008 | Bartley et al. | |
| 2008/0244206 A1* | 10/2008 | Heo | G06F 12/1491 |
| | | | 711/163 |
| 2011/0202739 A1 | 8/2011 | Grisenthwaite | |
| 2012/0124429 A1* | 5/2012 | Ahn | G06F 11/3471 |
| | | | 714/45 |
| 2012/0137079 A1 | 5/2012 | Ueda | |
| 2013/0117531 A1 | 5/2013 | Grochowski et al. | |
| 2015/0199198 A1 | 7/2015 | Ven et al. | |

FOREIGN PATENT DOCUMENTS

| | | |
|---|---|---|
| EP | 2603872 B1 | 8/2015 |
| TW | 200638723 | 11/2006 |
| TW | 201204040 | 1/2012 |

OTHER PUBLICATIONS

European Supplemental Search Report for Application No. EP 15 85 1712, dated Apr. 3, 2018, 8 pages.
International Search Report for International Application No. PCT/US2015/045953, dated Dec. 28, 2015.

* cited by examiner

400

Start 402 → DETERMINE AN ACCESS MODE OF A TASK 404 → DETERMINE PAGE FRAME NUMBERS USED BY THE TASK 406 → SELECT A PROTECTION KEY 408 → STORE THE ACCESS MODE, THE PAGE FRAME NUMBERS AND THE PROTECTION KEY IN A PAGE TABLE ENTRY 410 → End 412

*Figure 4*

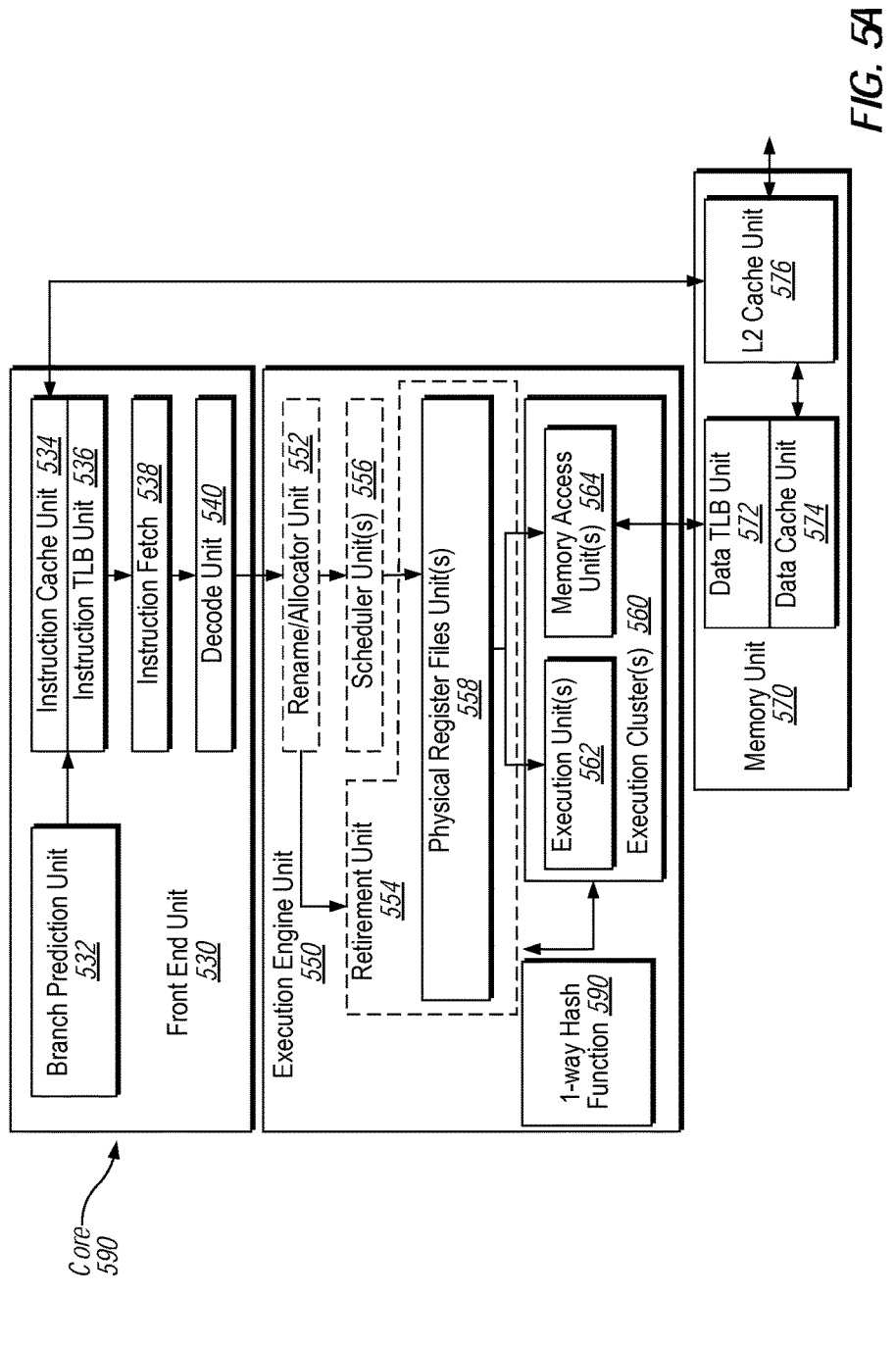
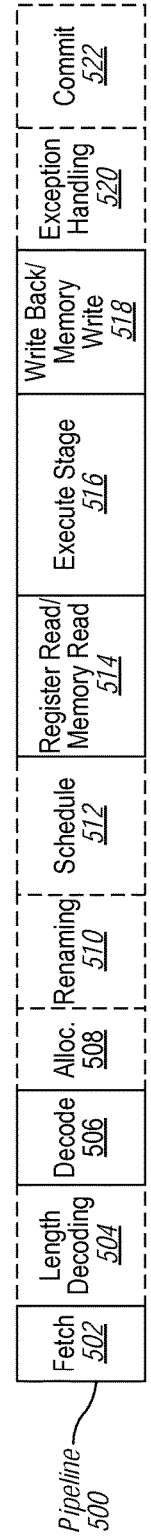
FIG. 5A
FIG. 5B

US 10,489,309 B2

MEMORY PROTECTION KEY ARCHITECTURE WITH INDEPENDENT USER AND SUPERVISOR DOMAINS

TECHNICAL FIELD

The embodiments of the disclosure relate generally to a computing device, and, more specifically, relate to memory protection key architecture with independent user and supervisor domains.

BACKGROUND

Application programs may include unintended bugs that attempt to access regions of the memory that should not be accessed (referred to as stray accesses). Accesses may include writing and reading in the memory, and the stray accesses include stray write and stray read. To prevent the stray accesses from accessing or corrupting memory in unintended ways, certain memory protection mechanism is needed.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of a method to operate a processor including cores and a memory management unit according to an embodiment of the present disclosure.

FIG. 5A is a block diagram illustrating a micro-architecture for a processor in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

Figure 1:
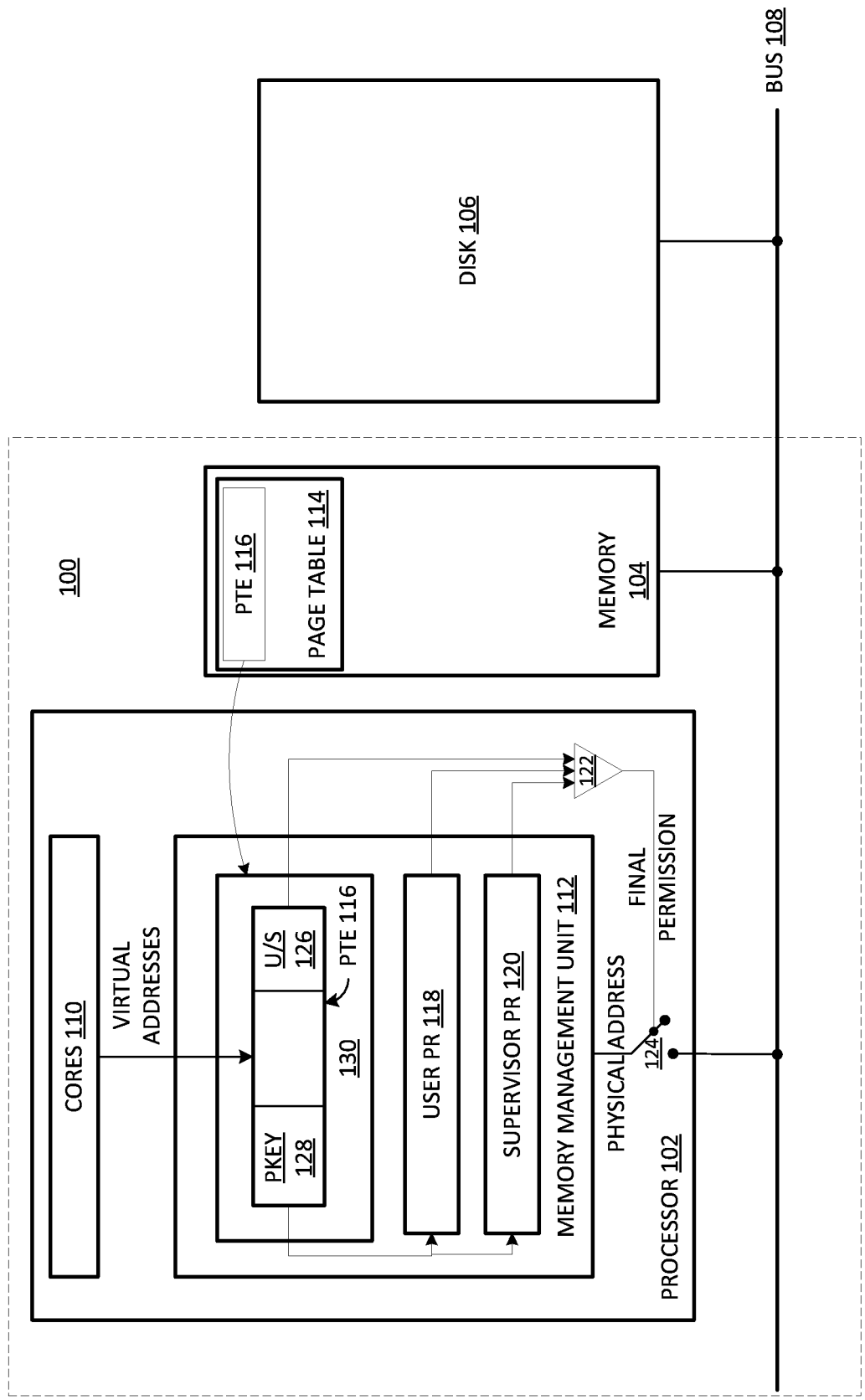
FIG. 1 illustrates a processing system according an embodiment of the present disclosure.

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program address the memory using virtual addresses (or linear addresses) of a virtual memory which may be translated into physical addresses of the memory by a memory management unit (MMU) associated with the one or more processors. The virtual memory may be organized according to pages stored that may be translated into page frames of the memory. Each page of the virtual addresses may correspond to a memory frame of the memory. The pages of virtual memory may be identified according to page numbers while the page frames of the memory may be identified according to memory frame numbers. Each virtual address may include a page number and an offset within the page at the page number. Therefore, a specific physical address of the memory may be determined by looking up a page table for a page number and the offset. Each page table entry specifies the virtual address to physical address translation as well as other attributes of the memory page, such as access permissions. In this way, the space of virtual addresses accessible by tasks executed on the processing cores may be larger than the physical memory addresses.

An application program may be associated with a privilege level that determines its access mode (e.g., as a user or as a supervisor) to memory. For example, a user application may have a low privilege of a user-mode, and a system application (such as the kernel) may have a high privilege of a supervisor-mode. The task executed on a processing core may need to access (read or write) memory referenced by the virtual addresses which may be translated into the physical addresses of the memory by the memory management unit.

A page table entry is an item of a page table that is used to mapping virtual addresses to physical addresses of the memory. The page table entry may include a field to store the type of page referenced by the page table entry. For example, one bit with "1" indicates a user page, and with "0" indicates a supervisor page. The memory pages whose page table entry indicate a user page may be accessed by tasks running at any privilege levels (including user applications having a user-mode access and system applications having a supervisor-mode access), while memory pages whose page table entry indicate a supervisor page are restricted to tasks running at the privilege level higher than the user level. In one embodiment, the operating system may assign a portion of the memory as supervisor pages reserved for the kernel of the operating system. The operating system may also assign a portion of the memory to user pages for use by user application programs.

During a memory access, stray accesses may occur when a program accesses a memory location allocated to the program in unintended way due to a program error. To prevent stray accesses from accessing or corrupting memory in unintended ways, each memory page may be associated with a protection key (a string of binary bits selected by the operating system for the task) that may be used to retrieve bits stored in one or more permission registers, the bits reflecting the memory access permissions for the task with respect to the memory page. The retrieved memory access permissions may be used to prevent the task from exceeding its permission with respect to the memory frame. In certain implementations, protection key architectures tag each page table entry in a page table with an n-bit protection key without distinguishing whether a page table entry is created for user pages or for supervisor pages.

Embodiments of the present disclosure include a protection key architecture that treats the pages of virtual addresses stored in a page table entry according to whether the page table entry is identified as associated with user pages or supervisor pages. Based on the classification, the user domain of the memory (or portions of memory identified with the user mode) and the supervisor domain (or portions of memory identified with the supervisor mode) may be protected by separate permission registers. In certain implementations, the permission register associated with user domains may be modified directly by user application without the assistance of the kernel of the operating system.

FIG. 1 illustrates a system-on-a-chip (SoC) 100 including a processing system to protect the memory according an embodiment of the present disclosure. The SoC 100 may include a processor (such as a central processing unit (CPU)) 102 and a memory that are connected to each other via a bus system 108. A disk 106 may be coupled to the processor 102 and the memory 104 via the bus 106 to provide swap space in the event that the memory does not have enough space for a task. The memory 104 and disk 106 may store of system application and user application programs and the data associated with the programs. The processor 102 may execute tasks such as system applications and user applications using the memory 104 to store the instructions of the programs and data associated with the programs.

In one embodiment, the processor 102 may further include one or more processing cores 110 and a memory management unit (MMU) 112. The one or more processing cores are the engines within the processor 102 for executing the tasks. In one embodiment, the tasks executed on processing cores 110 do not access the memory 104 directly using the physical addresses of the memory. Instead, the tasks access a virtual memory through virtual addresses (also known as linear addresses). The memory management unit 112, coupled between the processing cores 110 and the memory, may map the virtual addresses of the virtual memory to the physical addresses of the memory 104. The space of virtual addresses may be divided into fixed sized units called pages. A page of the virtual addresses may be mapped correspondingly into fixed-sized units in the space of the physical addresses of the memory 104 called memory frames.

In one embodiment, the memory 104 may include a page table 114 for storing mappings between pages of virtual addresses to physical addresses. The mappings may be the mapping between identifiers of pages (or page numbers) to identifiers of memory frames (or memory frame numbers). The memory frame numbers determine the region of the memory 104 allocated to a task.

In one embodiment, the virtual address page table 114 may include one or more page table entries (PTEs) 116. The page table entries are also known as leaf nodes of the page table. In one embodiment, a page table entry 116 of the page table 114 may be loaded into a page table register 130 of the memory management unit 112 so that the memory management unit 112 may perform the memory address mapping. Each of the page table entries may store one or more memory frame numbers that are identified according to virtual address page numbers. In one embodiment, a task executing on the processing cores 110 may allocate a block of memory by specifying one or more virtual address ranges. A virtual address may include a first portion including one or more bits (e.g., the high-order twenty bits) indicating the virtual address page number and a second portion of bits (e.g., the lower-order 12 bits) indicating the byte offset within a memory frame corresponding to the page. The memory management unit 112 may use the virtual address page number to identify a memory frame number stored in the page table entry 116, and combine the identified memory frame number and the offset byte to form a physical address for accessing the memory 104. The physical address corresponding to the virtual address may be stored in a buffer.

In one embodiment, the memory management unit 112 may include logics to check the memory access permission for the task to prevent certain types of memory accesses (e.g., those caused by stray accesses). In one embodiment, each page table entry 116 may include one or more status bits to indicate certain page access statuses that need to be checked before mapping the page numbers in page table entry to memory frame numbers. In one embodiment, one of the status bits in each page table entry 116 is a memory access mode status bit U/S 126 to indicate if the page belongs to the user type or the supervisor type. Details of the status check are discussed in conjunction with the description of FIG. 2.

In one embodiment, the page table entry 116 may further include a protection key section 128 to store a protection key selected by the operating system for the page table entry 116 at the time of its creation. In one embodiment, the operating system may select the protection key from a set of existing protection keys available to the operating system. For example, there may be sixteen protection keys available for the operating system to select, and the operating system may select one that is designated as the next available protection key. In one embodiment, a protection key is a string of binary bits (e.g., 4 bits) that is used as an identifier to retrieve a set of memory access permissions stored in one or more permission registers.

In one embodiment, the memory management unit 112 may include a user permission register 118 and a supervisor permission register 120. The user permission register 118 is a register including a number of fields each storing a set of memory access permissions for a set of user pages, and the supervisor permission register 120 is a register including a number of fields each storing a memory access permission for a set of supervisor pages. In one embodiment, the protection key 128 stored in a page table entry 116 may identify a particular permission stored in a field of the user permission register 118 or the supervisor permission register 120. For example, the protection key 128 may be an index to the field that stores the set of permissions of each permission register. Therefore, each set of permissions stored in the user permission register 118 and the supervisor permission register 120 may be uniquely retrieved according the protection key 128 and the user or supervisor memory access mode of the page U/S 126 in the page table entry 116.

In one embodiment, each field of the user permission register 118 and the supervisor permission register 120 may store a set of permission including a number of memory access permission bits. In one embodiment, the set of permissions may include a first bit to indicate whether read access is enabled or disabled, a second bit to indicate whether write access is enabled or disabled, and a third bit to indicate whether execution access is enabled or disabled. In one embodiment, the permission may also include bits indicating permissions for encrypting the memory frames stored in the page table entry 116 and other defined attributes.

In one embodiment, the memory management unit 112 may include an ADD logic circuit 122 including input pins to receive the set of permissions selected from the user permission register 118 or the supervisor permission register 120, and from the memory access permission generated based on the status bits stored in the page table entry 116. The ADD logic circuit 122 may combine the set of permissions received from the user permission register 118 or the supervisor permission register 120 with the memory access permission generated based on the status bits stored in the page table entry 116 to generate a final memory access permission for accessing the memory frames referenced in the page table entry 116.

In one embodiment, in response to a request by a task executing on the cores 110 to access memory frames whose identifiers stored in the page table entry 116, the memory management unit 112 may generate a final memory access permission which may determine whether the request from the task has exceeded the permission assigned to the task. The final memory access permission may be used to control a switch 124. If the request from the task does not exceed the final memory access permission, the switch 124 may engage and allow the physical address to pass through to the bus 108 for accessing the memory 104. If the request from the task exceeds the final memory access permission, the gate 124 may disengage and prevent the physical address from the bus 108.

In one embodiment the content of the user permission registers may be read or updated by tasks executing at any privilege level, for example an user application programs and the kernel of the operating system, while the content of the supervisor permission register may only be read or update by tasks executing at a privilege level higher than user, for example the kernel of the operating system.

Figure 2:
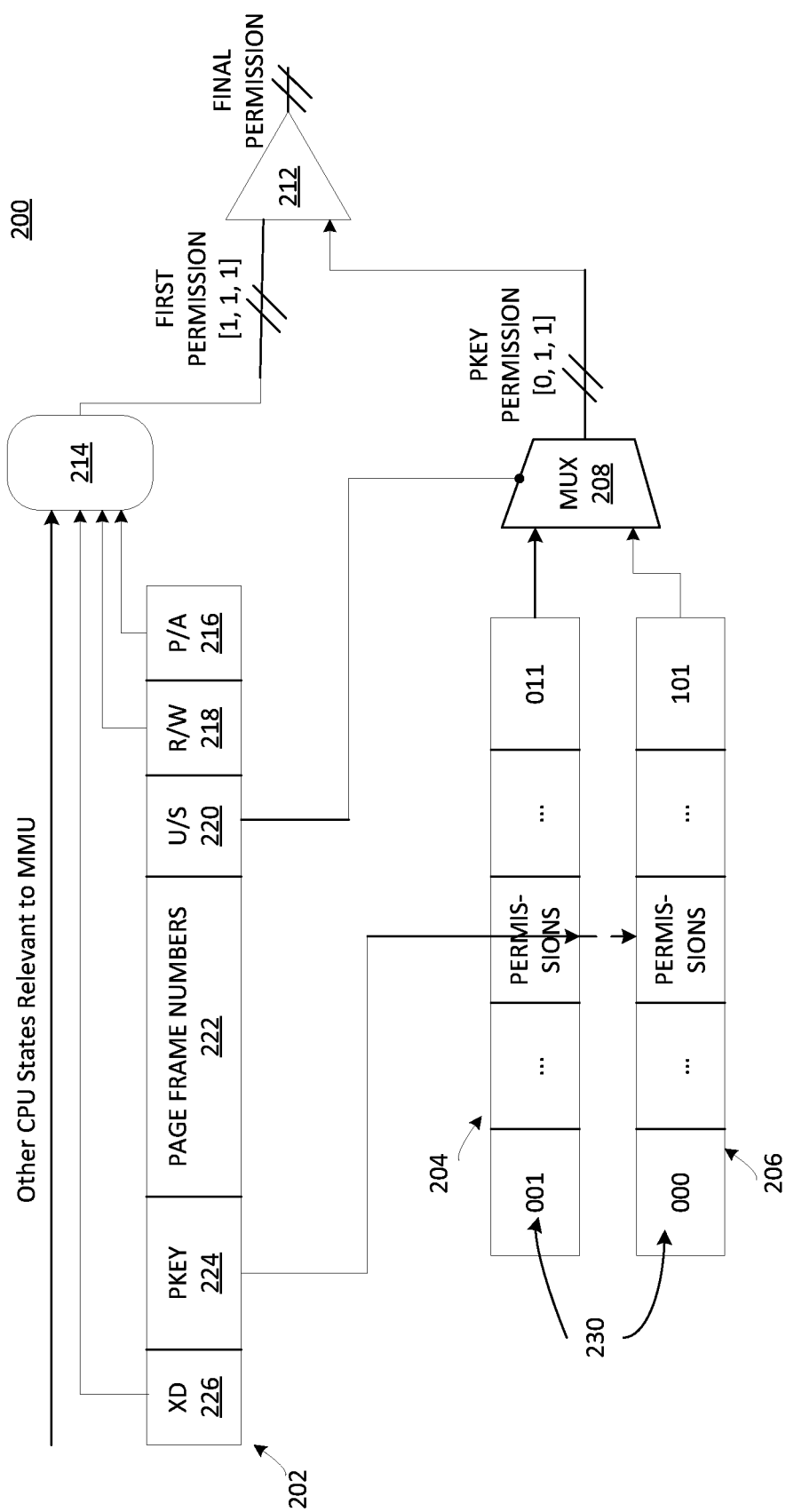
FIG. 2 illustrates a memory management unit according to an embodiment of the present disclosure.

FIG. 2 illustrates a detailed memory management unit 200 according to an embodiment of the present disclosure. As shown in FIG. 2, the memory protection unit 200 may include a page table entry 202 as part of a page table, a first permission register 204 (referred to as the user permission register) dedicated to memory frames of the user mode, and a second permission register 206 (referred to as the supervisor permission register) dedicated to memory frames of the supervisor mode. The page table entry 202 may be one of multiple page table entries stored in a virtual address page table 114 as shown in FIG. 1. Each of the user permission register 204 and the supervisor permission register 206 may include a number of fields to store the memory access permissions associated with each protection key 224.

In one embodiment, the page table entry 202 may include one or more status bits, a protection key section 224, and a memory frame number section 222. The memory frame number section 222 (e.g., 32 bits in size) stores the memory frame numbers that the page numbers of virtual addresses are mapped to.

In one embodiment, the one or more status bits may include a Present/Absent (P/A) 216 bit indicating whether the memory frames of the page table entry is in the memory. A "1" of the P/A bit 216 may indicate that the memory frames are in the memory, and a "0" may indicate that the memory frames are swapped out of the memory to the disk. The one or more status bit may include a Read/Write (R/W) bit 218 indicating the memory access permission to the portion of the memory specified by the memory frames in the page table entry 202. For example, a "0" of the R/W bit 218 may indicate that the portion of the memory is read-only (or cannot write), and a "1" may indicate that the portion of the memory can be read and write. The one or more status bits may include a XD bit 226 indicating the execution permission to the instructions stored in the portion of memory. For example, a "1" of the XD bit 226 may indicate that instruction fetches from the portion of memory are not allowed.

In one embodiment, the page table entry 202 may include a memory access mode bit or user/supervisor (U/S) status bit 220 indicating the privilege level of the task that is to access the memory frames referenced by the memory frame numbers of the page table entry 202. In one embodiment, a "1" of the U/S status bit 220 may indicate that the task having a user-mode privilege or higher can access memory frames identified in the page table entry 202, and a "0" of the U/S status bit 220 may indicate that only tasks having a supervisor-mode access may access the memory frames.

In one embodiment, the protection key section 224 may store an n-bit protection key (PKEY) that is tagged by the operating system to the page table entry 202 for protecting memory frames of the page table entry 202. In one embodiment, in response to mapping a memory frame in the task, the operating system may select a protection key (PKEY) from a number of protection keys available to the operating system and use the selected protection key to tag the page table entry 202. In one embodiment the operating system may provide an interface that application can use to request the specific protection key be used in a memory page. In one embodiment, the protection key is a string of n bits of binary code that may be used as an identifier to the permissions stored in the fields of the user permission register 204 or the supervisor permission register 206. For example, a protection key of 0010 may point to the field of user permission register 204 or the supervisor permission register 206 identified at 0010 position.

In one embodiment, since the protection key 224 is n-bit in length, each of the user permission register 204 and the supervisor permission register 206 may include uniquely addressable $2^n$ fields.

In one embodiment, each set of permissions stored in the fields of the user permission register 118 and the supervisor permission register 120 may include a number of memory access permission bits 230. In one embodiment, the set of permission bits 230 may include a first bit to indicate whether read access is enabled or disabled, a second bit to indicate whether write access is enabled or disabled, and a third bit to indicate whether execution access is enabled or disabled. In one embodiment, the permission may also include bits indicating permissions for encrypting the memory frames stored in the page table entry 116 and other defined attributes.

In one embodiment, the memory access permission bits stored in the user permission register 204 and the supervisor permission register 206 are set by the operating system at the time to initiate the task or when switching to another task.

In one embodiment, the user permission register 204 may be accessed by a user application having a user-mode access. Instructions to read or write the user permission register 204 may be provided to user applications. For example, the instructions include a user permission register read (RDPKRU) instruction that may allow a user application program to read the content of the user permission register 204, and a user permission register write (WRPKRU) instruction that may allow the user application program to write to the user permission register 204. By allowing the user application to directly manipulate the permissions stored in the user permission register 204, the performance overhead of changing the set of permissions through protection keys (e.g., by going through the operating system) may be reduced significantly, allowing for much broader use of the protection keys.

In one embodiment, the memory management unit may include a multiplexer 208 having a first input to receive a first set of permissions (selected according to the protection key 224) stored in the user permission register 204, a second input to receive a second set of permissions (selected according to the protection key 224) stored in the supervisor permission register 206, and a control pin coupled to the access mode bit (U/S bit) 220 of the page table entry 202. The access mode bit 220 may selectively provide either the first set of permissions or the second set of permissions at the output of the multiplexer 208.

In one embodiment, in response to a request to access the memory frames in the memory specified in the page table entry 202, a memory management unit 112 may perform two access permission checks. First, the memory management unit 112 may include a controller 214 that may receive, at input, the one or more status bit (such as XD 226, R/W 218, P/A 216) stored in the page table entry 202, and status bits from the processor (such as the Supervisor Mode Execution Protection (SMEP) status and the Current Privilege Level (CPL) of the executing task) that define the processor operating modes. The controller 214 may, based on the status bits, output a first permission including a first set of permission bits indicating the memory access permission based on the status bits of the page table entry. In one embodiment, the first set of permission bits may include a first bit to indicate whether read is enabled or disabled, a second bit to indicate whether write is enabled or disabled, and a third bit to indicate whether execution is enabled or disabled.

In one embodiment, the memory management unit 112 may provide a second permission check in response to the request by a task to access the memory frames in the memory specified in the page table entry 202. In one embodiment, the memory management unit 112 may include a multiplexer 208 including a first input coupled to the user permission register 204 and a second input coupled to the supervisor permission register 206. The multiplexer 208 may further include a control pin coupled to the U/S bit 220 of the page table entry 202. The value stored in the U/S bit 220 may control which permission register provides its content at the output of the multiplexer 208, and the protection key 224 determines which field provides the permission. The output of the multiplexer 208 may provide a second set of permission bits including a first bit to indicate whether read is enabled or disabled, a second bit to indicate whether write is enabled or disabled, and a third bit to indicate whether execution is enabled or disabled. In one embodiment, the permission may also include bits indicating permissions for encrypting the memory frames stored in the page table entry 116 and other defined attributes.

In one embodiment, the memory management unit 112 may include an AND logic 212 including a first input to receive the first set of permission bits from the controller 214 and a second input to receive the second set of permission bits from the multiplexer 208. The AND logic 212 may generate a set of final memory access permissions based on the first set of permissions and the protection key permissions. The set of final memory access permissions may include permission bits using the lowest permission between the first set of permissions and the protection key permissions. For example, if the first set of permission bits have a write permission bit indicating write enabled and the second set of permission bits have a write permission bit indicating write disabled, the write permission bit for the final set is disabled. However, if the write permission bits in both sets indicate write enabled, the write permission in the final permission is enabled.

In one embodiment, the request to access a memory by a task is compared to the final permission to determine whether the request exceeds the permissions granted to the task. If exceeded, the memory management unit may generate a page fault signal to prevent the output of the physical addresses to the bus 108 and inform the processing core of the result.

Figure 3:
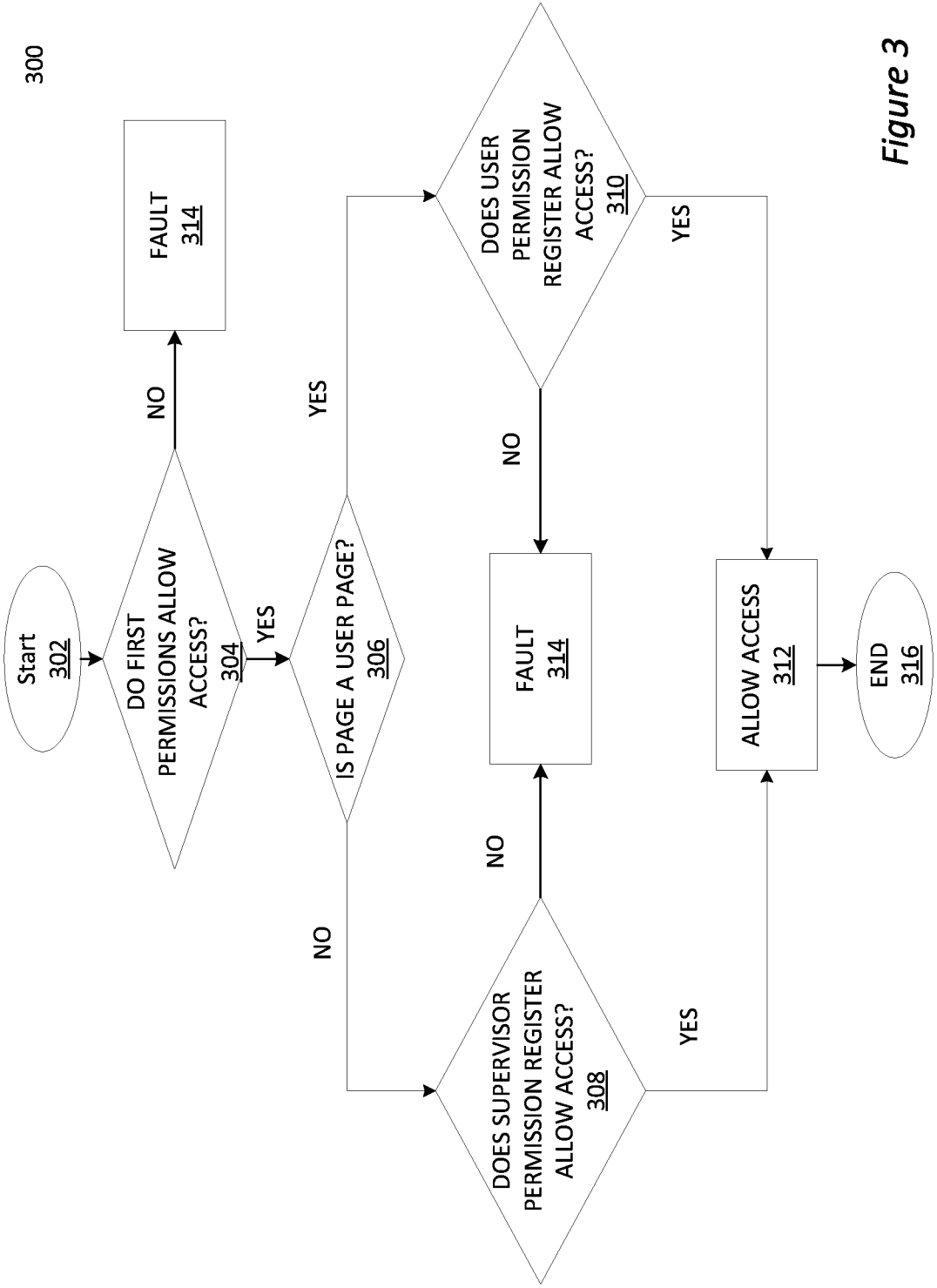
FIG. 3 is a flow diagram illustrating the operations of a memory management unit according to an embodiment of the present disclosure.

FIG. 3 is a flow diagram of operations 300 of checking the permissions to access a memory by a memory management unit according to an embodiment of the present disclosure. Referring to FIG. 3, the operations may start at 302 in response to a memory request by a task executing either in the user-mode access or the supervisor-mode access. The memory management unit may search for a page table entry base on the virtual address of the memory requested by the task and determine the memory frames of the memory stored in the page table entry, and perform the mapping from the virtual addresses to the physical addresses of the memory.

Prior to allowing the access of the memory based on the physical address, at 304, a controller of the memory management unit may generate a first set of permissions base on the status bits (such as XD, P/A, R/W) and processor status bits of the processor operation. The memory management unit may determine whether the first set of permissions allows the access to the physical addresses of the memory. If the first set of permissions does not allow the requested access by the task, at 314, the memory management unit may generate a page fault signal to the processing cores to inform the requesting task.

If the first permission allows the access, at 306, the memory management unit may determine whether the page table entry was tagged with a user mode or a supervisor mode based on the U/S bit stored in the page table entry. If the page table entry is for the user mode, at 310, the memory management unit may use the protection key stored in the page table entry to select a second set of permissions stored in the user permission register and determine whether the second set of permissions allows the requested access to the memory by the task. If it is allowed, at 312, the memory management unit may allow the task to access the memory frames whose memory frame numbers stored in the page table entry. If it is not allowed, at 314, the memory management unit may generate a page fault signal and do not allow the access to the memory frames.

If the page table entry is determined for the supervisor mode, at 308, the memory management unit may use the protection key stored in the page table entry to select the second set of permissions stored in the supervisor permission register and determine whether the second set of permissions allows the requested access to the memory by the task. If it is not allowed, at 314, the memory management unit may generate a page fault signal and do not allow the access to the memory frames. If it is allowed, at 312, the memory management unit may allow the task to access the memory frames whose memory frame numbers stored in the page table entry.

FIG. 4 is a flow diagram of a method to operate a processor including cores and a memory management unit according to an embodiment of the disclosure. Method 400 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 400 may be performed, in part, by processing logics of any one of processing cores 110 executing an operating system with respect to FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, the processing logic (such as an operating system) may start managing a task (such as the execution of a user application program or a kernel). At 404, the processing logic may determine at which privilege level the task operates. The privilege level of the task determines the mode of memory access to be a user-mode access or a supervisor-mode access. In one embodiment, the processing logic may receive the privilege level from a register that keeps a record of the current privilege level (CPL) which may support levels from 0 to 3 with 3 as the lowest level (such as a user application) and 3 as the highest (such as a kernel of the operating system). The task may either run at a user level (e.g., CPL=3) or at a supervisor level (e.g., CPL<3).

At 406, the processing logic may determine identifiers (or numbers) of the memory frames of a memory allocated by the task.

At 408, the processing logic may select a protection key from a set of protection keys available to the processing logic. The protection key may be n-bit of binary codes that may be used to identify memory access permission stored in one or more permission registers.

At 410, the processing logic may store the access mode and the determined identifiers of memory frames, and the selected protection key in a page table entry of a page table of a memory management unit. The page table entry may be used to map virtual addresses to physical address of a memory and determine the access permission to the memory.

In one embodiment, the processing logic may determine a memory access permission for the task, the memory access permission comprising at least one of a first bit indicating a read permission, a second bit indicating a write permission, or a third bit indicating an execution permission. The processing logic may select one of a user permission register or a supervisor permission register based on the access mode being a user-mode access or a supervisor-mode access. The processing logic may store the memory access permission in a field of the selected permission register using the protection key as an identifier.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
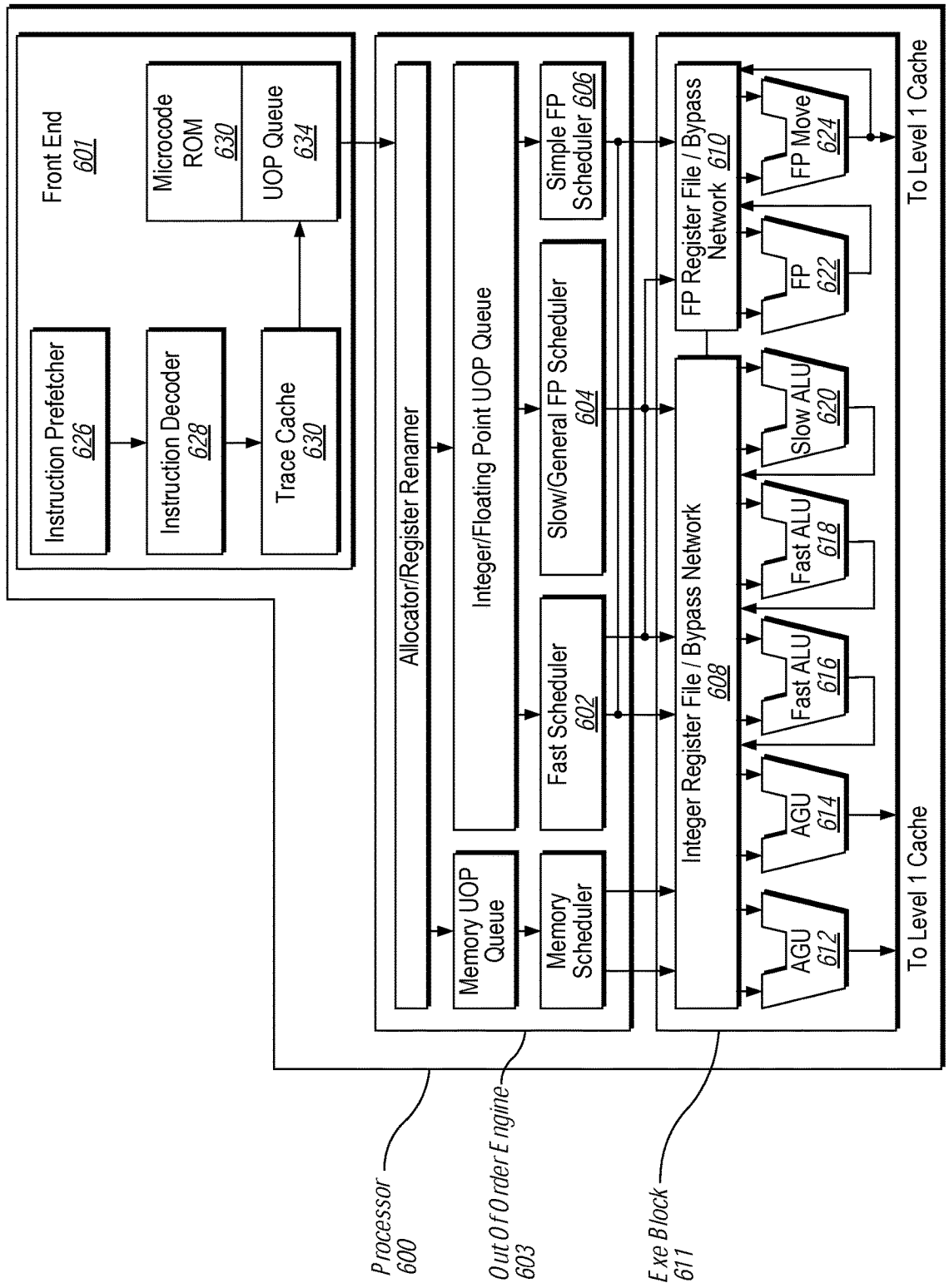
FIG. 6 illustrates a block diagram of the micro-architecture for a processor in accordance with one embodiment of the disclosure.

FIG. 6 illustrates a block diagram of the micro-architecture for a processor 600 in accordance with one embodiment of the disclosure. In some embodiments, an instruction in accordance with one embodiment can be implemented to operate on data elements having sizes of byte, word, double-word, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
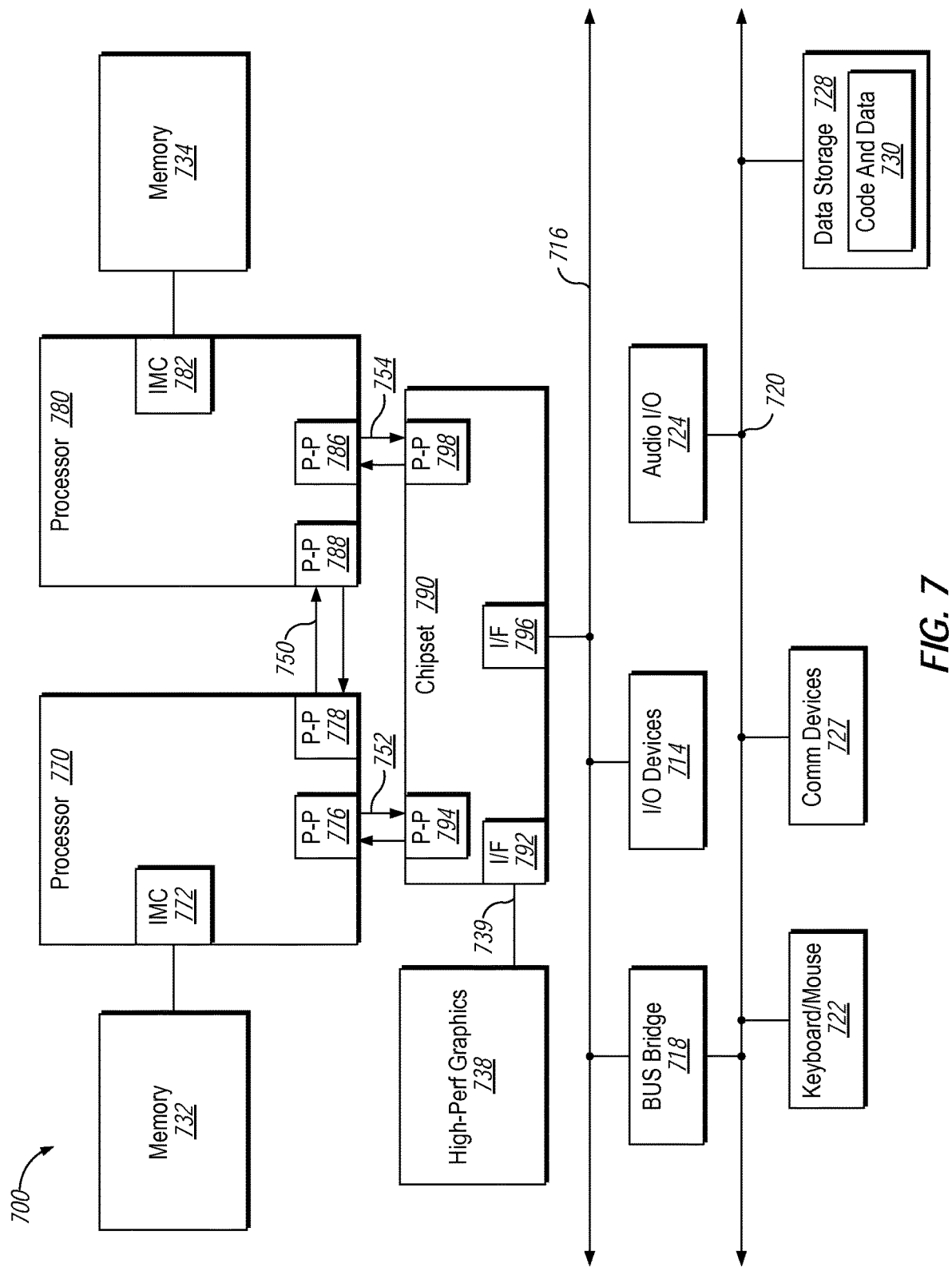
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that embodiments of the disclosure are not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
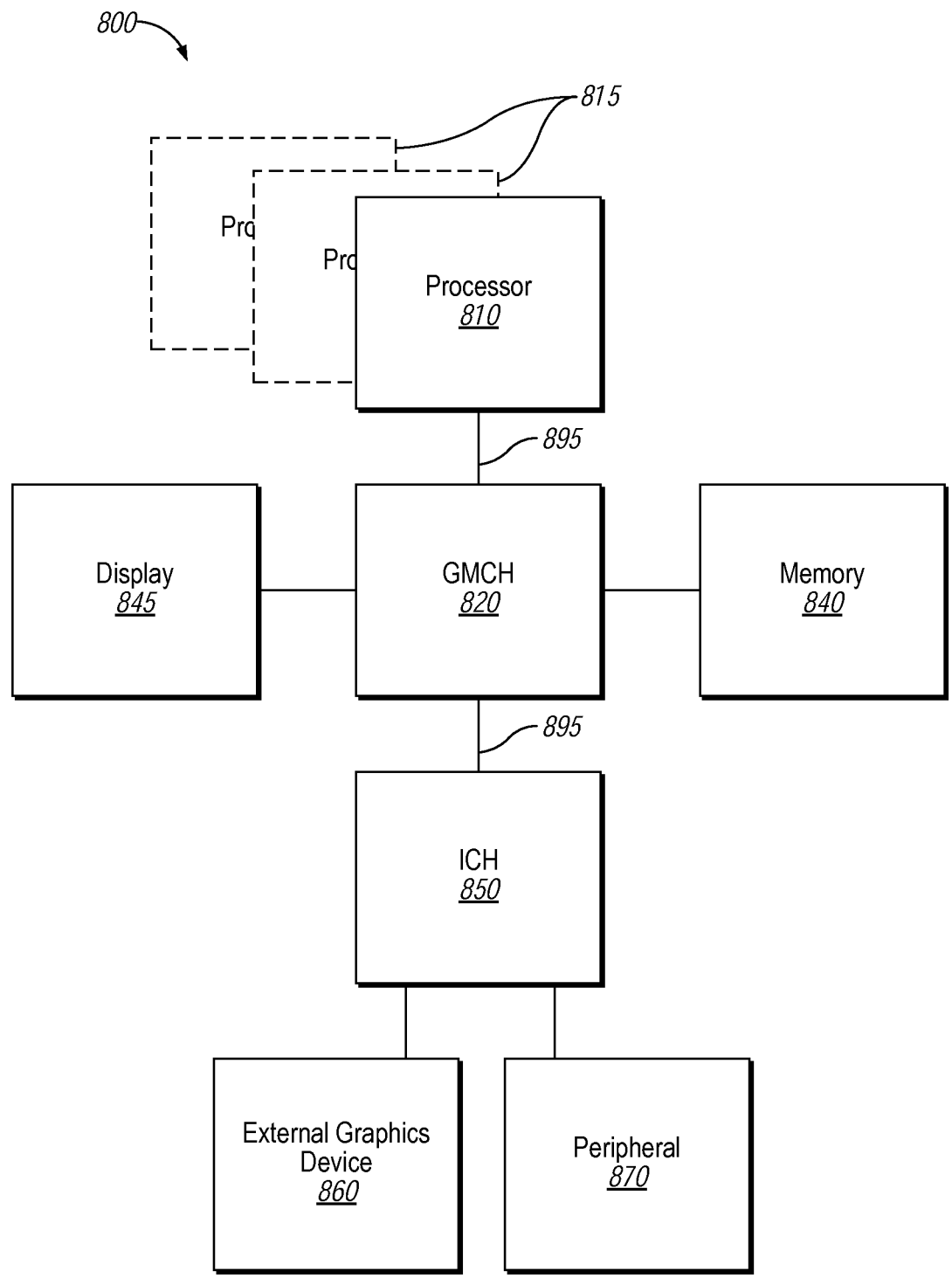
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800.

For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
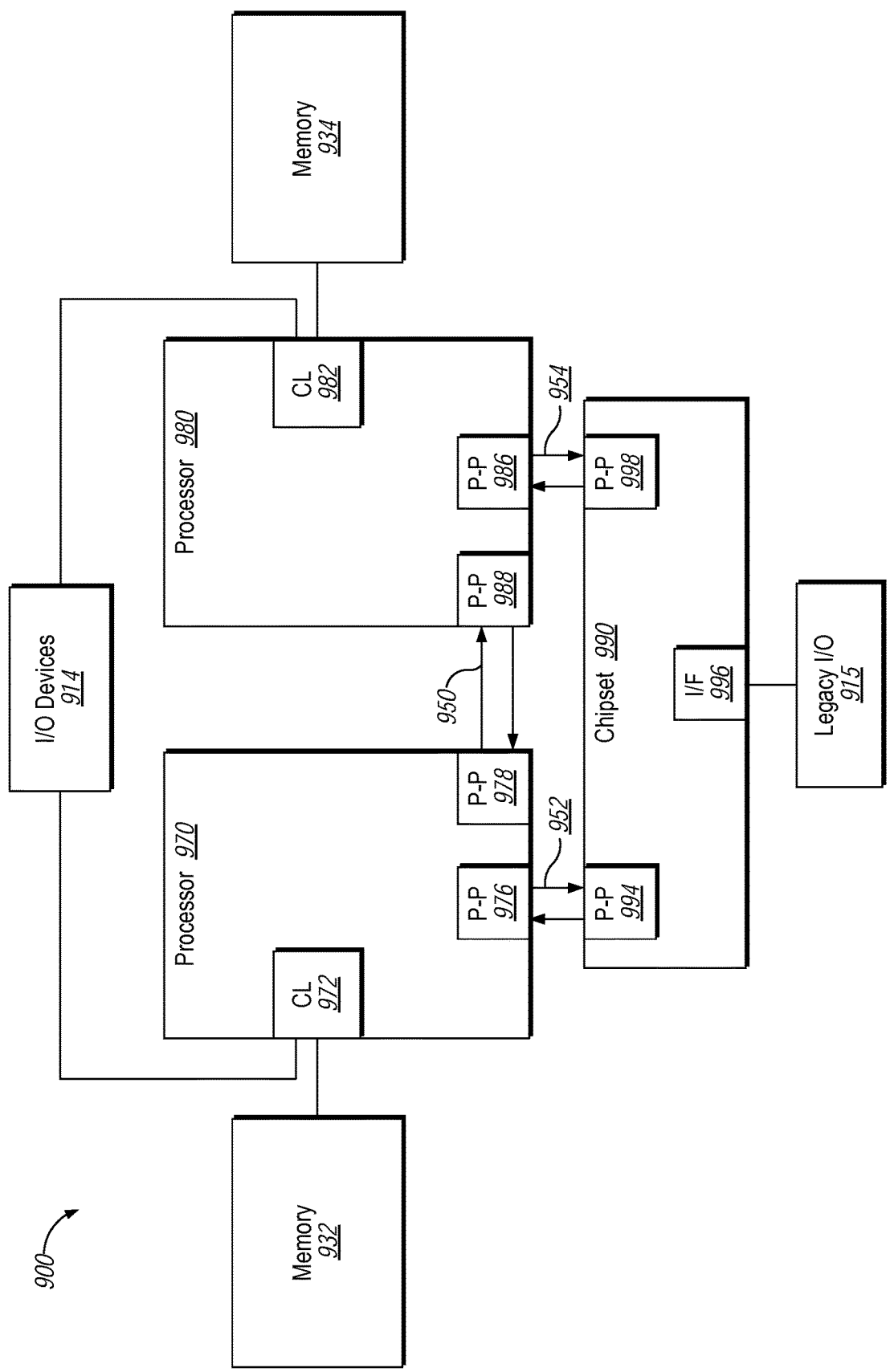
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
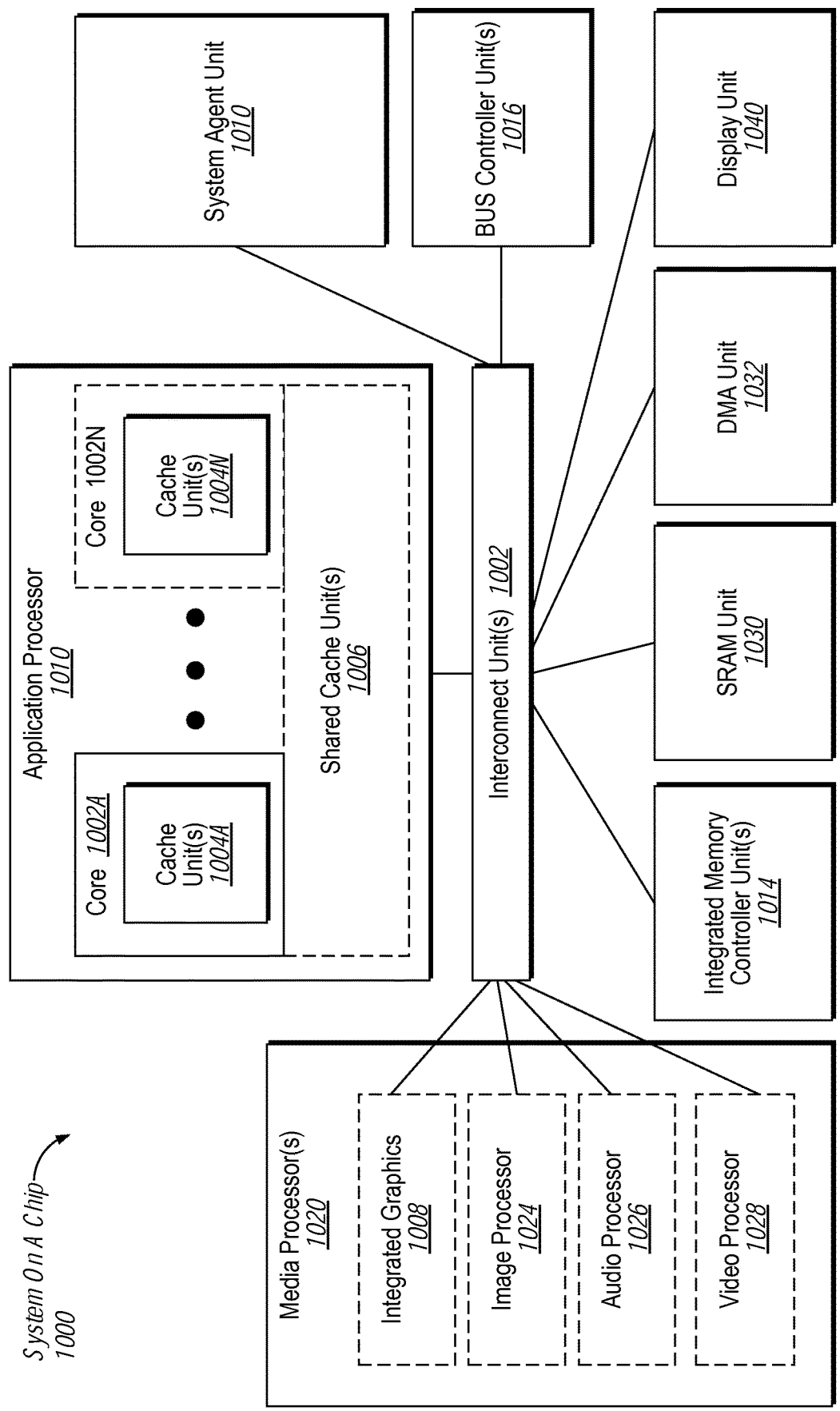
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
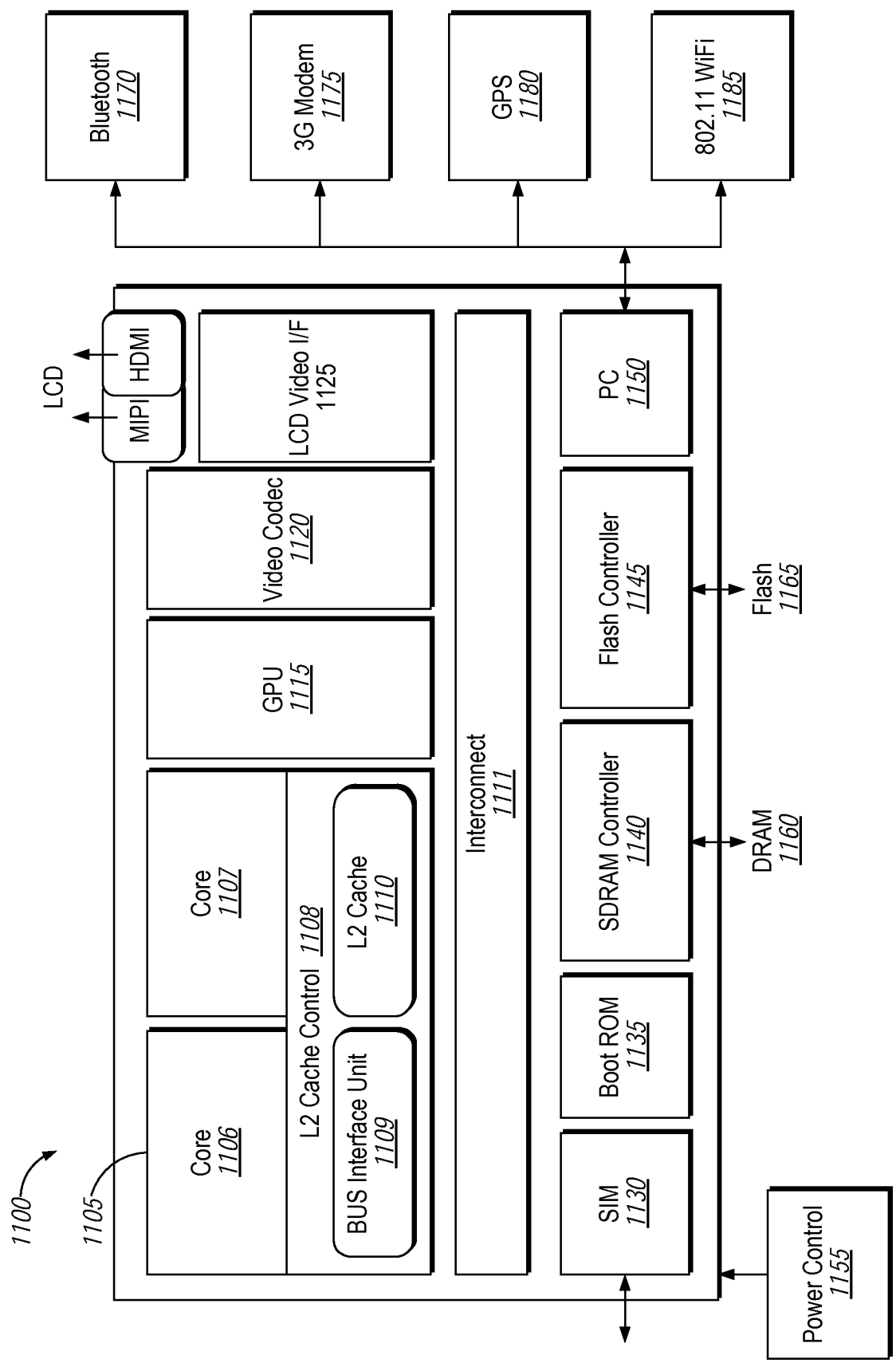
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
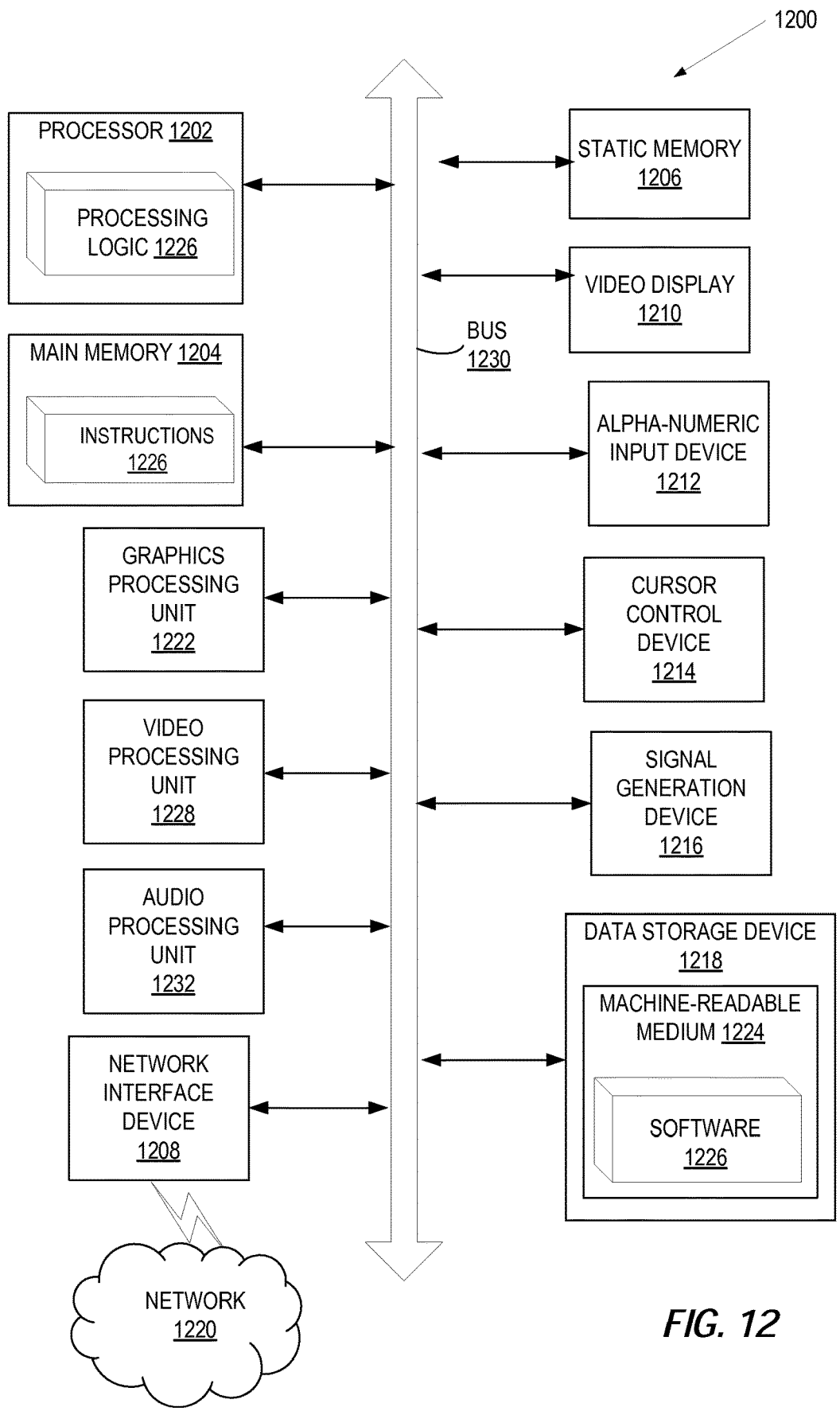
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing system including a processing core to execute a task and a memory management unit, coupled to the processing core. The memory management unit includes a storage unit to store a page table entry including one or more identifiers of memory frames, a protection key, and an access mode bit indicating whether the one or more memory frames are accessible according to a user mode or according to a supervisor mode, a first permission register including a plurality of fields, each field comprising a set of bits reflecting a set of memory access permissions under the user mode, and a second permission register storing a plurality of fields, each field comprising a set of bits reflecting a set of memory access permissions under the supervisor mode.

In Example 2, the subject matter of Example 1 can optionally provide that the memory management unit further comprises a multiplexer comprising a first input coupled to the first permission register, a second input coupled to the second permission register, and a control pin coupled to the access mode bit.

In Example 3, the subject matter of any of Examples 1 and 2 can optionally provide that the multiplexer, responsive to the access mode bit indicating the user mode, is to provide a first set of bits stored in one of the plurality of fields of the first permission register to an output of the multiplexer, and the multiplexer, responsive to the access mode bit indicating the supervisor mode, is to provide a second set of bits stored in one of the plurality of fields of the second permission register to the output of the multiplexer.

In Example 4, the subject matter of Example 3 can optionally provide that the one of the plurality of fields of the first permission register is selected according to the protection key of the page table entry, and the one of the plurality fields of the second permission register is selected according to the protection key of the page table entry.

In Example 5, the subject matter of Example 4 can optionally provide that wherein the first set of bits comprises at least one of a first bit indicating a read permission, a second bit indicating a write permission, or a third bit indicating an execution permission, and wherein the second set of bits comprises at least one of a first bit indicating a read permission, a second bit indicating a write permission, or a third bit indicating an execution permission.

In Example 6, the subject matter of Example 5 can optionally provide that the page table entry comprises a plurality of status bits.

In Example 7, the subject matter of Example 6 can optionally provide that the memory management unit comprises a controller to receive the plurality of status bits and determine a first set of memory access permissions based on the plurality of status bits, and wherein the first set of memory access permissions comprises at least one of a first bit indicating a read permission, a second bit indicating a write permission, or a third bit indicating an execution permission.

In Example 8, the subject matter of Example 7 can optionally provide that the memory management unit comprises an AND logic comprising a first input to receive the first of memory access permissions and a second input to receive a second set of memory access permissions from the output of the multiplexer, wherein the AND logic is to generate a set of final memory access permissions based on the first and the second sets of memory access permissions.

In Example 9, the subject matter of Example 8 can optionally provide that the memory management unit provides the task access to the one or more memory frames based on the final memory access permission.

In Example 10, the subject matter of Example 1 can optionally provide that the task has a privilege level of one of a user-mode access or a supervisor-mode access.

In Example 11, 10, the subject matter of any of Examples 1 and 10 can optionally provide that the first permission register is accessible by the task having a privilege level of one of the user-mode access or the supervisor-mode access.

In Example 12, the subject matter of Example 11 can optionally provide that the first permission register comprises multiple permissions bits that are settable by the task having the privilege level of one of the user-mode access or the supervisor-mode access.

In Example 13, the subject matter of Example 12 can optionally provide that the task having the privilege level of one of the user-mode access or the supervisor-mode access is to identify a permission bit stored in the first permission register and set the permission bit to disable the permission.

In Example 14, the subject matter of Example 13 can optionally provide that the protection key comprises n bits, and each of the first and second permission registers comprises $2^n$ fields.

Example 15 is a system-on-a chip (SoC) including a memory and a processor, communicatively coupled to the memory, the processor including a processing core to execute a task, and a memory management unit, coupled to the processing core, the memory management unit including a storage unit to store a page table entry comprising one or more identifiers of memory frames, a protection key, and an access mode bit indicating whether the one or more memory frames are accessible according to a user mode or according to a supervisor mode, a first permission register comprising a plurality of fields, each field comprising a set of bits reflecting a set of memory access permissions under the user mode, and a second permission register storing a plurality of fields, each field comprising a set of bits reflecting a set of memory access permissions under the supervisor mode.

In Example 16, the subject matter of Example 15 can optionally provide that the memory management unit further comprises a multiplexer comprising a first input coupled to the first permission register, a second input coupled to the second permission register, and a control pin coupled to the access mode bit.

In Example 17, the subject matter of any of Examples 15 and 16 can optionally provide that the multiplexer, responsive to the access mode bit indicating the user mode, is to provide a first set of bits stored in one of the plurality of fields of the first permission register to an output of the multiplexer, and the multiplexer, responsive to the access mode bit indicating the supervisor mode, is to provide a second set of bits stored in one of the plurality of fields of the second permission register to the output of the multiplexer.

In Example 18, the subject matter of Example 17 can optionally provide that the one of the plurality of fields of the first permission register is selected according to the protection key of the page table entry, and the one of the plurality fields of the second permission register is selected according to the protection key of the page table entry.

In Example 19, the subject matter of Example 17 can optionally provide that the first set of bits comprises at least one of a first bit indicating a read permission, a second bit indicating a write permission, or a third bit indicating an execution permission, and wherein the second set of bits comprises at least one of a first bit indicating a read permission, a second bit indicating a write permission, or a third bit indicating an execution permission.

In Example 20, the subject matter of Example 19 can optionally provide that the page table entry comprises a plurality of status bits, wherein the memory management unit comprises a controller to receive the plurality of status bits and determine a first set of memory access permissions based on the plurality of status bits, and wherein the first set of memory access permissions comprises at least one of a first bit indicating a read permission, a second bit indicating a write permission, or a third bit indicating an execution permission, and wherein the memory management unit comprises an AND logic comprising a first input to receive the first of memory access permissions and a second input to receive a second set of memory access permissions from the output of the multiplexer, wherein the AND logic is to generate a set of final memory access permissions based on the first and the second sets of memory access permissions.

Example 21 is a method including determining, by a processing core, an access mode of a task based on a privilege level of the task, wherein the access mode is one of a user-mode access or a supervisor-mode access, determining an identifier of a memory frame allocated by the task, selecting, by the processing core executing an operating system, a protection key for the task, and storing the protection key, the access mode, and the identifier in a page table entry of a memory management unit coupled to the processing core.

In Example 22, the subject matter of Example 21 can further include determining a memory access permission for the task, the memory access permission comprising at least one of a first bit indicating a read permission, a second bit indicating a write permission, or a third bit indicating an execution permission, selecting, based on the access mode, one of a first permission register assigned for the user-mode access or a second permission register assigned for the supervisor-mode access, identifying, based on the protection key, a field in the selected one of the first permission register or the second permission register, and storing the memory access permission in the identified field.

In Example 23, the subject matter of any of Examples 21 and 22 can optionally provide that the first permission register is accessible by the task having a privilege level of the user-mode access, and wherein the first permission register comprises a write disable bit that is settable by the task having the privilege level of the user-mode access.

Example 24 is an apparatus including: means for performing the subject matter of any one of Examples 21 and 22.

Example 25 is a machine-readable non-transitory medium having stored thereon program codes that, when executed, perform operations, the operations including determining, by a processing core, an access mode of a task based on a privilege level of the task, wherein the access mode is one of a user-mode access or a supervisor-mode access, determining an identifier of a memory frame allocated by the task, selecting, by the processing core executing an operating system, a protection key for the task, and storing the protection key, the access mode, and the identifier in a page table entry of a memory management unit coupled to the processing core.

In Example 26, the subject matter of Example 25 can further include determining a memory access permission for the task, the memory access permission comprising at least one of a first bit indicating a read permission, a second bit indicating a write permission, or a third bit indicating an execution permission, selecting, based on the access mode, one of a first permission register assigned for the user-mode access or a second permission register assigned for the supervisor-mode access, identifying, based on the protection key, a field in the selected one of the first permission register or the second permission register, and storing the memory access permission in the identified field.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system comprising:
   a processing core for executing a task associated with one of a user mode or a supervisor mode; and
   a memory management unit, coupled to the processing core, comprising:
      a storage unit to store a page table entry comprising identifiers of one or more memory frames, a protection key, and an access mode bit indicating whether the one or more memory frames are accessible by the task according to the user mode or according to the supervisor mode;
      a first permission register associated with the user mode, the first permission register to store a plurality of fields, each one of the plurality of fields comprising a set of bits reflecting a set of memory access permissions for the task to access under the user mode; and
      a second permission register associated with the supervisor mode, the second permission register to store a plurality of fields, each one of the plurality of fields comprising a set of bits reflecting a set of memory access permissions for the task to access under the supervisor mode,
   wherein the processing core is to execute the task to access the one or more memory frames according to one of the user mode or the supervisor mode determined based on the access mode bit.

2. The processing system of claim 1, wherein the memory management unit further comprises a multiplexer comprising a first input coupled to the first permission register, a second input coupled to the second permission register, and a control pin coupled to the access mode bit.

3. The processing system of claim 2, wherein the multiplexer, responsive to the access mode bit indicating the user mode, is to provide a first set of bits stored in one of the plurality of fields of the first permission register to an output of the multiplexer, and the multiplexer, responsive to the access mode bit indicating the supervisor mode, is to provide a second set of bits stored in one of the plurality of fields of the second permission register to the output of the multiplexer.

4. The processing system of claim 3, wherein the one of the plurality of fields of the first permission register is selected according to the protection key of the page table entry, and the one of the plurality of fields of the second permission register is selected according to the protection key of the page table entry.

5. The processing system of claim 3, wherein the first set of bits comprises at least one of a first bit indicating a read permission, a second bit indicating a write permission, or a third bit indicating an execution permission, and wherein the second set of bits comprises at least one of a first bit indicating a read permission, a second bit indicating a write permission, or a third bit indicating an execution permission.

6. The processing system of claim 5, wherein the page table entry comprises a plurality of status bits.

7. The processing system of claim 6, wherein the memory management unit comprises a controller to receive the plurality of status bits and determine a first set of memory access permissions based on the plurality of status bits, and wherein the first set of memory access permissions comprises at least one of a first bit indicating a read permission, a second bit indicating a write permission, or a third bit indicating an execution permission.

8. The processing system of claim 7, wherein the memory management unit comprises an AND logic comprising a first input to receive the first set of memory access permissions and a second input to receive a second set of memory access permissions from the output of the multiplexer, wherein the AND logic is to generate a set of final memory access permissions based on the first and the second sets of memory access permissions.

9. The processing system of claim 8, wherein the memory management unit provides task access to the one or more memory frames based on the set of final memory access permissions.

10. The processing system of claim 1, wherein the task has a privilege level of one of a user-mode access or a supervisor-mode access.

11. The processing system of claim 10, wherein the first permission register is accessible by the task having a privilege level of one of the user-mode access or the supervisor-mode access.

12. The processing system of claim 11, wherein the first permission register comprises multiple permissions bits that are settable by the task having the privilege level of one of the user-mode access or the supervisor-mode access.

13. The processing system of claim 12, wherein the task having the privilege level of one of the user-mode access or the supervisor-mode access is to identify a permission bit stored in the first permission register and set the permission bit to disable a corresponding permission.

14. The processor system of claim 1, wherein the protection key comprises n bits, and each of the first and second permission registers comprises $2^n$ fields.

15. A system-on-a chip (SoC) comprising:
   a memory; and
   a processor, communicatively coupled to the memory, comprising:
      a processing core for executing a task associated with one of a user mode or a supervisor mode; and
      a memory management unit, coupled to the processing core, comprising:
         a storage unit to store a page table entry comprising identifiers of one or more memory frames, a protection key, and an access mode bit indicating whether the one or more memory frames are accessible by the task according to the user mode or according to the supervisor mode;
         a first permission register associated with the user mode, the first permission register to store a plurality of fields, each one of the plurality of fields comprising a set of bits reflecting a set of memory access permissions for the task to access under the user mode; and
         a second permission register associated with the supervisor mode, the second permission register to store a plurality of fields, each one of the plurality of fields comprising a set of bits reflecting a set of memory access permissions for the task to access under the supervisor mode,
      wherein the processing core is to execute the task to access the one or more memory frames according to one of the user mode or the supervisor mode determined based on the access mode bit.

16. The SoC of claim 15, wherein the memory management unit further comprises a multiplexer comprising a first input coupled to the first permission register, a second input coupled to the second permission register, and a control pin coupled to the access mode bit.

17. The SoC of claim 16, wherein the multiplexer, responsive to the access mode bit indicating the user mode, is to provide a first set of bits stored in one of the plurality of fields of the first permission register to an output of the multiplexer, and the multiplexer, responsive to the access mode bit indicating the supervisor mode, is to provide a second set of bits stored in one of the plurality of fields of the second permission register to the output of the multiplexer.

18. The SoC of claim 17, wherein the one of the plurality of fields of the first permission register is selected according to the protection key of the page table entry, and the one of the plurality of fields of the second permission register is selected according to the protection key of the page table entry.

19. The SoC of claim 17, wherein the first set of bits comprises at least one of a first bit indicating a read permission, a second bit indicating a write permission, or a third bit indicating an execution permission, and wherein the second set of bits comprises at least one of a first bit indicating a read permission, a second bit indicating a write permission, or a third bit indicating an execution permission.

20. The SoC of claim 19, wherein the page table entry comprises a plurality of status bits, wherein the memory management unit comprises a controller to receive the plurality of status bits and determine a first set of memory access permissions based on the plurality of status bits, and wherein the first set of memory access permissions comprises at least one of a first bit indicating a read permission, a second bit indicating a write permission, or a third bit indicating an execution permission, and wherein the memory management unit comprises an AND logic comprising a first input to receive the first set of memory access permissions and a second input to receive a second set of memory access permissions from the output of the multiplexer, wherein the AND logic is to generate a set of final memory access permissions based on the first and the second sets of memory access permissions.

21. A method, comprising:
determining, by a processing core, an access mode of a task based on a privilege level of the task, wherein the access mode is one of a user-mode access or a supervisor-mode access;
determining an identifier of a memory frame allocated by the task;
selecting, by the processing core executing an operating system, a protection key for the task;
storing the protection key, the access mode, and the identifier in a page table entry of a memory management unit coupled to the processing core;
determining a memory access permission for the task, the memory access permission comprising at least one of a first bit indicating a read permission, a second bit indicating a write permission, or a third bit indicating an execution permission;
selecting, based on the access mode, one of a first permission register associated with the user-mode access or a second permission register associated with the supervisor-mode access;
identifying, based on the protection key, a field in the selected one of the first permission register or the second permission register;
storing the memory access permission in the identified field of the selected one of the first permission register or the second permission register; and
executing the task to access one or more memory frames according to one of the user mode or the supervisor mode determined based on the access mode bit.

22. The method of claim 21, wherein the first permission register is accessible by the task having a privilege level of the user-mode access, and wherein the first permission register comprises a write disable bit that is settable by the task having the privilege level of the user-mode access.

* * * * *